US008732776B2

(12) United States Patent
Youssefmir et al.

(10) Patent No.: US 8,732,776 B2
(45) Date of Patent: May 20, 2014

(54) END OF SHOW HANDLING

(75) Inventors: Michael Youssefmir, Portola Valley, CA (US); Philip R. Wiser, Nevada City, CA (US); James Vincent Burmeister, Tamarac, FL (US)

(73) Assignee: Kuautli Media Investment Zrt., Budapest (HU)

( * ) Notice: Subject to any disclaimer, the term of this patent is extended or adjusted under 35 U.S.C. 154(b) by 2 days.

(21) Appl. No.: 13/163,512

(22) Filed: Jun. 17, 2011

(65) Prior Publication Data

US 2012/0005705 A1    Jan. 5, 2012

Related U.S. Application Data

(60) Provisional application No. 61/360,842, filed on Jul. 1, 2010.

(51) Int. Cl.
H04N 7/173     (2011.01)
H04N 7/16      (2011.01)
G06F 15/177    (2006.01)
G06F 15/16     (2006.01)

(52) U.S. Cl.
USPC ............... 725/95; 725/25; 709/221; 709/231

(58) Field of Classification Search
USPC ............ 725/39, 40, 32, 25, 95; 709/231, 221
See application file for complete search history.

(56) References Cited

U.S. PATENT DOCUMENTS

| 5,933,605 | A | 8/1999 | Kawano et al. |
| 6,040,829 | A | 3/2000 | Croy et al. |
| 6,072,982 | A * | 6/2000 | Haddad .......................... 725/93 |
| 6,216,141 | B1 | 4/2001 | Straub |
| 6,637,029 | B1 | 10/2003 | Maissel et al. |
| 6,698,020 | B1 | 2/2004 | Zigmond et al. |
| 6,774,864 | B2 | 8/2004 | Evans et al. |
| 6,975,301 | B2 | 12/2005 | Fan |
| 7,024,156 | B2 | 4/2006 | Kawamata et al. |
| 7,036,139 | B2 | 4/2006 | Aras |
| 7,170,420 | B2 | 1/2007 | Phifer |
| 7,295,253 | B1 | 11/2007 | Gerstman |
| 7,352,414 | B2 | 4/2008 | Lee |
| 7,363,569 | B2 | 4/2008 | Pendakur et al. |

(Continued)

FOREIGN PATENT DOCUMENTS

EP     0804012     10/1997
EP     1041824     10/2000

(Continued)

OTHER PUBLICATIONS

International Search Report for PCT/US2008/014041, 2009.

(Continued)

Primary Examiner — James R Sheleheda
(74) Attorney, Agent, or Firm — Notaro, Michalos & Zaccaria P.C.

(57) ABSTRACT

A content delivery system that works in a broadcast and linear content environment causing real time display of received linear content. The system limits the display of the linear content by determining a time to automatically change the display of the linear content based upon program guide information and other factors, unless a signal is or has been received from a user indicating further interest in the content.

20 Claims, 1 Drawing Sheet

(56) References Cited

U.S. PATENT DOCUMENTS

| | | | |
|---|---|---|---|
| 7,406,315 B2 * | 7/2008 | Uhlik et al. | 455/452.1 |
| 7,423,662 B2 | 9/2008 | Unger | |
| 7,432,990 B2 | 10/2008 | Borden, IV et al. | |
| 7,567,565 B2 * | 7/2009 | La Joie | 370/390 |
| 7,869,783 B2 | 1/2011 | Morton | |
| 7,917,925 B2 | 3/2011 | Eigeldinger | |
| 7,992,185 B2 | 8/2011 | Kanda | |
| 8,037,504 B2 * | 10/2011 | Jerding et al. | 725/91 |
| 8,281,352 B2 * | 10/2012 | Brooks et al. | 725/95 |
| 8,365,007 B2 * | 1/2013 | Rieger et al. | 714/4.1 |
| 8,392,732 B2 * | 3/2013 | Francisco | 713/310 |
| 8,584,170 B2 * | 11/2013 | Park et al. | 725/51 |
| 2002/0059588 A1 | 5/2002 | Huber et al. | |
| 2002/0144262 A1 | 10/2002 | Plotnick et al. | |
| 2002/0184626 A1 | 12/2002 | Darbee et al. | |
| 2003/0056217 A1 * | 3/2003 | Brooks | 725/46 |
| 2004/0003400 A1 | 1/2004 | Carney et al. | |
| 2004/0172650 A1 | 9/2004 | Hawkins et al. | |
| 2004/0250273 A1 | 12/2004 | Swix et al. | |
| 2005/0026690 A1 | 2/2005 | Silver | |
| 2005/0114794 A1 | 5/2005 | Grimes et al. | |
| 2005/0235307 A1 * | 10/2005 | Relan et al. | 725/14 |
| 2005/0246738 A1 | 11/2005 | Lockett | |
| 2006/0026302 A1 | 2/2006 | Bennett et al. | |
| 2006/0031880 A1 | 2/2006 | Stark et al. | |
| 2006/0064729 A1 * | 3/2006 | Steading | 725/95 |
| 2006/0150120 A1 | 7/2006 | Dresti | |
| 2006/0171390 A1 * | 8/2006 | La Joie | 370/390 |
| 2006/0271982 A1 * | 11/2006 | Gallou et al. | 725/100 |
| 2007/0061830 A1 * | 3/2007 | Chang | 725/9 |
| 2007/0143493 A1 * | 6/2007 | Mullig et al. | 709/232 |
| 2007/0220577 A1 * | 9/2007 | Kongalath | 725/131 |
| 2007/0266414 A1 | 11/2007 | Kahn et al. | |
| 2007/0294717 A1 | 12/2007 | Hill et al. | |
| 2008/0046584 A1 * | 2/2008 | Tucker | 709/231 |
| 2008/0066106 A1 | 3/2008 | Ellis et al. | |
| 2008/0127277 A1 | 5/2008 | Kuschak | |
| 2008/0235746 A1 | 9/2008 | Peters et al. | |
| 2008/0320540 A1 * | 12/2008 | Brooks et al. | 725/118 |
| 2009/0157826 A1 * | 6/2009 | Stettner | 709/206 |
| 2009/0165064 A1 * | 6/2009 | Gong et al. | 725/93 |
| 2009/0178089 A1 * | 7/2009 | Picco et al. | 725/87 |
| 2010/0125884 A1 * | 5/2010 | Howcroft | 725/93 |
| 2010/0175086 A1 * | 7/2010 | Gaydou et al. | 725/39 |
| 2011/0061088 A1 * | 3/2011 | Rieger et al. | 725/120 |
| 2011/0145708 A1 * | 6/2011 | Bhogal et al. | 715/716 |
| 2011/0258463 A1 * | 10/2011 | Francisco | 713/300 |
| 2011/0307548 A1 * | 12/2011 | Fisk et al. | 709/203 |
| 2013/0031579 A1 * | 1/2013 | Klappert | 725/32 |
| 2013/0067522 A1 * | 3/2013 | Morrissey et al. | 725/93 |
| 2013/0159544 A1 * | 6/2013 | Cooper | 709/231 |
| 2013/0159752 A1 * | 6/2013 | Francisco | 713/323 |

FOREIGN PATENT DOCUMENTS

| | | |
|---|---|---|
| WO | WO01/52537 | 7/2001 |
| WO | WO02/097611 | 12/2002 |
| WO | WO2004/057874 | 7/2004 |
| WO | WO2006/011796 | 2/2006 |
| WO | WO2007/068290 | 2/2007 |
| WO | WO2008/127737 | 10/2008 |
| WO | WO2009/038829 | 3/2009 |

OTHER PUBLICATIONS

International Search Report for PCT/US2008/004922, 2008.
International Search Report for PCT/US2008/012418, 2009.
Appeal Decision of EP08865944.6, 2004.
European Search Report EP 12 159 533.4, 2012.
Opinion of EP 08865944.6, 2011.
Rejection of EP 08 831 750.8, 2012.
U.S. Appl. No. 13/163,512 Office Action, 2012.
U.S. Appl. No. 12/819,001 Office Action, 2012.
International Search Report Opinion PCT/US2008/004922, 2008.
International Search Report Opinion PCT/US2008/014014, 2009.
International Search Report Opinion PCT/US2008/014041, 2009.
International Search Report Opinion PCT/US2008/065429, 2009.
International Preliminary Report PCT/2008/014014, 2010.
International Preliminary Report PCT/US2008/004922, 2009.
International Preliminary Report PCT/US2008/012418, 2010.
International Preliminary Report PCT/US2008/014041, 2010.
International Preliminary Report PCT/US2008/065429, 2009.
International Search Report PCT/US2008/065429, 2009.

* cited by examiner

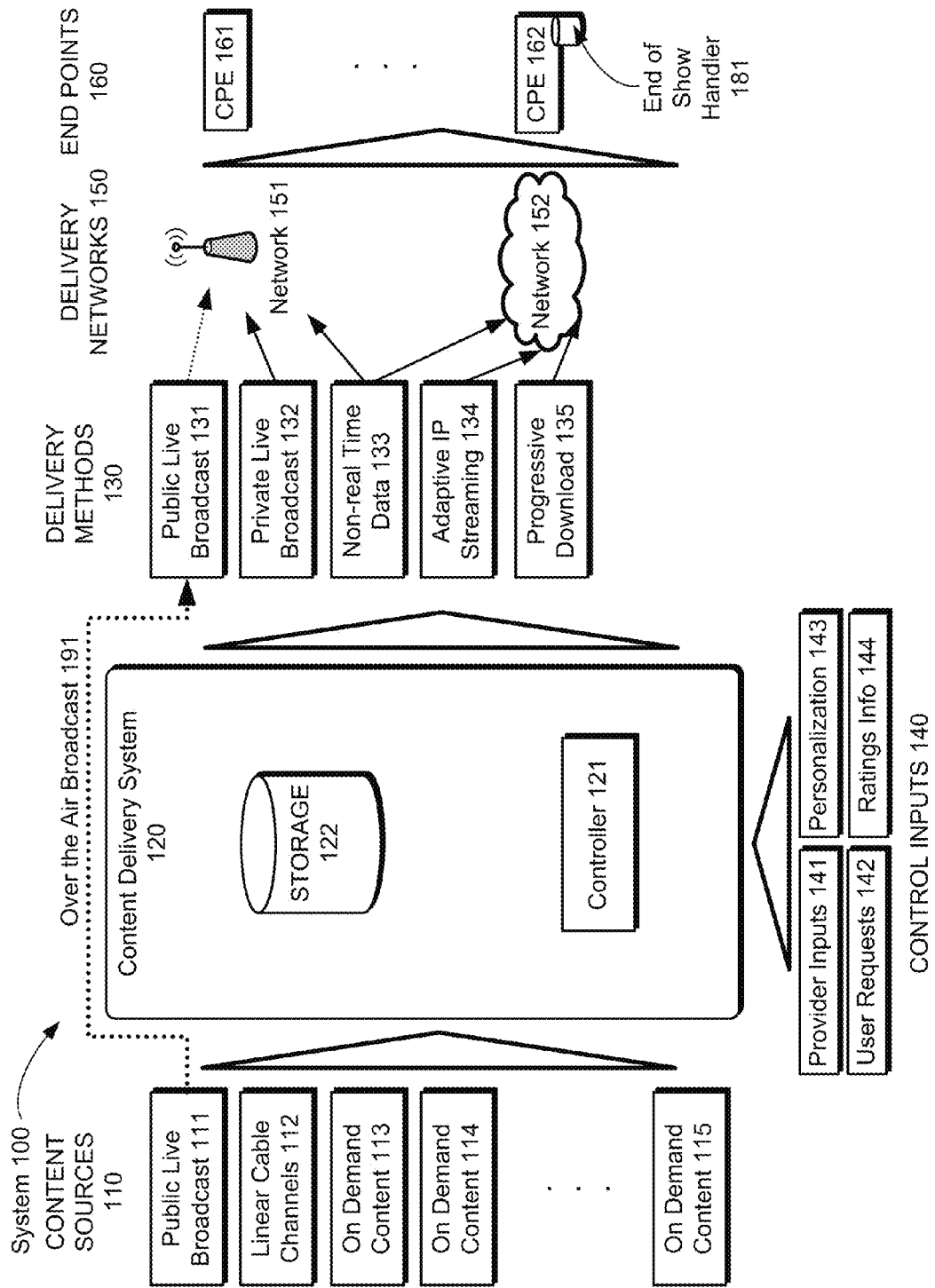

END OF SHOW HANDLING

STATEMENT OF RELATED CASES

This application claims priority from provisional application 61/360,842, filed Jul. 1, 2010.

BACKGROUND

1. Field

This disclosure is generally related to content delivery systems. More specifically, this disclosure is related to providing a user-directed, linear content delivery system.

2. Related Art

Live IP streaming of live events such as concerts, seminars, and other events has been done by services such a YouTube as well as a variety of parties.

BRIEF DESCRIPTION OF THE FIGURES

FIG. 1 shows an architectural level schematic of a system in accordance with an embodiment.

DETAILED DESCRIPTION

Overview

The discussion is organized as follows. First an introduction describing some of the problems addressed by various embodiments will be presented, followed by an explanation of terminology that will be used throughout the discussion. Then, a high-level description of one embodiment will be discussed at an architectural level. Next, an architectural view of adaptive IP streaming will be presented. Then, details of algorithms used by embodiments are discussed. Lastly, various alternative embodiments are discussed.

Traditional systems that provide a wide array of linear content, especially live television and cable stations, together with nonlinear content require a significant amount of broadcast spectrum and/or infrastructure to the home. An approach using multiple networks to provide that breadth of content while efficiently using the broadcast spectrum has been pioneered by Sezmi Corporation, see, e.g. U.S. patent application Ser. No. 12/082,954 ("Networked Antenna and Transport System Unit" filed 14 Apr. 2008), Ser. No. 12/082,955 ("Viewer Interface for a Content Delivery System" filed 14 Apr. 2008), Ser. No. 12/131,009 ("Programming Content Reconstruction in a Content Delivery System" filed 30 May 2008), and Ser. No. 12/290,583 ("Remote Control Unit for a Personalized Video Programming System" filed 31 Oct. 2008), and PCT application PCT/US2008/014014 ("System for Content Delivery" filed 23 Dec. 2008).

As an example of the problem facing content delivery providers, if a customer's provider has only 20-30 Mbps of broadcast spectrum and is providing approximately 15 cable channels over that spectrum, as well as access to live over the air television content, how can the provider offer a deeper line-up of content (e.g. offering more linear content such as cable channels)? Adaptive IP streaming of additional linear cable channels can increase the depth of the line-up for live viewing of linear content. Typically, adaptive IP streaming is implemented via unicast transmission to an individual customer premises equipment (CPE) of the stream. However, adaptive IP streaming can have high bandwidth costs for the provider. Similarly, end users may face a variety of caps on their broadband connection, e.g. maximum of 250 GB/month, etc.

Accordingly, using adaptive IP streaming to deliver the linear content of, for example, the Food Network via broadband, as opposed broadcast connection can have implications for both parties. For the provider, typically they are facing fees based on the amount of data transmitted. For the end user, they are consuming against their bandwidth cap for the month. Neither of those is typical in the broadcast case. Accordingly, embodiments can implement special techniques for handling the end of show on linear content delivered via adaptive IP streams.

In one embodiment, end users watching adaptive IP streams of linear content are prompted at the end of a program. The end of a program can be determined, for example, by using electronic program guide information available on the customer premises equipment. By prompting the user and requiring an affirmative action to remain "tuned" to the adaptive IP stream, both parties can benefit. The provider benefits by not paying IP transmission fees for streaming if nobody is watching and the end user benefits by not using up their bandwidth cap when they are not actively watching.

Additionally, in some embodiments, information about user choices at the end of show transitions for adaptive IP streams of linear content can be used for future broadcast vs. broadband delivery decisions. For example, if Food Network was previously delivered via adaptive IP streams, but end of show data suggests end users like to leave it on in the background, it may be more cost effective to deliver Food Network via broadcast. Accordingly, end of show decisions can play a part in making good use of available broadcast transmission capacity. The terminology that will be used throughout this discussion will now be introduced.

Terminology

Throughout this specification the following terms will be used:

Content: Content refers to a discrete piece of audiovisual programming. Some content is composed of multiple pieces of content. One example would be a single 30-minute situation comedy that is a piece of content that, when broadcast free over the air, generally includes commercials. The commercials are themselves content. The entirety of the broadcast is also considered a single piece of content. The intended meaning and scope of the term "content" should be apparent from the usage.

Provider: Provider refers to the entity, or entities, offering the content and related content delivery services to customers described by embodiments discussed herein. Providers may also offer programming. The provider could be an independent entity such as Sezmi Corporation, or a company more traditionally associated with providing linear content (e.g. cable and/or satellite programming) to customers such as a telephone company, an internet service provider (ISP), a cable company, or a satellite company.

Network: The term "network" has two distinct meanings in the context of this subject. The first meaning refers to the term given to broadcast, cable and/or satellite content originators, e.g. NBC network, Bravo network, etc. The second meaning refers to a technical computer network and the interconnection of devices via communications channels to permit communication between devices. Additional ambiguity can arise because individuals have small scale, or local area networks (LAN) inside their homes. And those networks are, in turn, coupled to the broader internet via an internet service provider (ISP). In general, the term "network" as used herein in the second sense will refer to the overall connection between the provider and the customer.

Two primary networks will be discussed, the first network being a network controlled and established by the provider.

This network will generally be created by the provider acquiring rights to a portion of broadcast spectrum for private use (for example, the Sezmi Corporation contracting with the local San Francisco Bay Area NBC affiliate for 10 Mbps of broadcast spectrum). Note that to implement this network Sezmi may make use of additional transmission media such as satellite uplinks and downlinks to communicate with that affiliate and create the network to the customers. Similarly, WiMax, cellular, or other broadcast spectrum could be used to provide the first network. The second network that will be discussed is an open, public network such as the internet. The communications over the internet may be encrypted and/or tunneled; however, that does not alter the public nature of the network.

Linear Content: Linear content refers to content that an originator is transmitting to a customer such that (i) it can be received and viewed in real time; and (ii) it is not possible to jump arbitrarily forward past what the originator has transmitted up to that point in time. An example of linear content is live over the air television, e.g. watching the opening ceremony of the Olympics or 30 Rock live at the time of the original transmission. If the customer records linear content for later playback ("time shifting"), when it is played back later from the full recording, the content is then considered nonlinear content. Notwithstanding that, some trick play capabilities for linear content playback (pause live TV, back up, jump forward to current point of transmission) will not cause linear content to be considered nonlinear.

Nonlinear Content: Nonlinear content refers to content where the viewer can control the playback of the content and can jump to arbitrary points in the content. Examples of nonlinear content include: video on demand, podcasts, downloadable content, YouTube and similar online video sites, as well as playback of previously recorded linear content.

Broadcast and Broadcast Transmission: A broadcast transmission, or broadcasting, refers to wide-scale single point to multiple recipient distribution of content. A variety of transmission media can be used, e.g. television, cellular, satellite, as well as wired communications (e.g. cable or fiber.) The distinguishing characteristic of a broadcast, as opposed to a unicast, transmission is the one-to-many nature of the transmission.

Usage note: embodiments often make use of the spectrum of broadcasters, for example an NBC affiliate in the San Francisco Bay Area, for delivering content to viewers. As such, sometimes the terms "broadcast" or "broadcast transmission" can refer to the activities of those broadcasters. The meaning should be apparent from the context. For example, in the San Francisco Bay Area, a provider contracts with the local NBC broadcast affiliate for broadcast spectrum to deliver 10 Mbps of bandwidth. The provider then uses that 10 Mbps of bandwidth for the broadcast transmission of four high-definition cable channels as linear programming, e.g. Bravo, Lifetime, Food Network, and Syfy networks. Those networks are linear content sent as broadcast transmissions to the viewers.

Unicast or Unicast Transmission: A unicast transmission, or unicasting, refers to point to single point distribution of content. Typically, the transmission medium is a broadband, or high-speed, network connection. An example of a unicast transmission would be the delivery of a video on demand purchase to a single viewer over a high-speed network such as the internet. Some internet content delivery companies, e.g. Akamai, talk of offering "broadcast scale" transmissions; however, the offerings are, in fact, hundreds, or millions, of unicast transmissions.

Real Time: The term "real time" has two distinct meanings in the context of this subject. The first meaning refers to a minimal delay from an original transmission until the program can be received and viewed. For example, a range from milliseconds to a couple of minutes in some circumstances would still be considered real time. The acceptable waiting time will be described in the context of the usage. These delays occur because the original transmission must be received, processed, retransmitted, and received by the viewer's equipment and displayed. Continuing the earlier example from above of broadcasting the Bravo network over the local NBC broadcast affiliate's bandwidth, it may take a few seconds for the Bravo satellite signal to be received, transcoded, encrypted, and sent back out over that local NBC broadcast affiliate to a viewer's reception equipment. Some networks may include a short tape delay as part of a live broadcast, but this would still be considered a real time transmission.

The second meaning of "real time" refers to the suitability of a content stream for viewing relative to when a viewer initiates a request for playback of content and when the user can begin watching the content continuously. Depending on the context and viewer expectations, different periods of delay may be acceptable. The acceptable waiting time will be described in the context of the usage. Which of the two meanings is intended should be apparent from the context.

Non-real time: Non-real time refers to transmissions and viewing characteristics that do not meet the definition(s) of real time.

System Overview

A system and processes described afford an improved way to handle the end of shows of adaptive IP streams of linear content. The system will be described with reference to FIG. 1 showing an architectural level schematic of a system in accordance with an embodiment. Because FIG. 1 is an architectural diagram, certain details are intentionally omitted to improve the clarity of the description. The discussion of FIG. 1 will be organized as follows. First, the elements of the figure will be described followed by their interconnections. Then, the use of the elements in the system will be described in greater detail.

FIG. 1 includes a system 100. The system includes content sources 110, a content delivery system 120, delivery methods 130, control inputs 140, delivery networks 150, and end points 160. The content sources 110 include public live broadcast 111, linear cable channels 112, and on demand content 113-115. The content delivery system 120 includes a controller 121 and a storage 122. The delivery methods 130 include public live broadcast 131, private live broadcast 132, non-real time data 133, adaptive IP streaming 134, and progressive download 135. Note that the difference between adaptive IP streaming 134 and progressive download 135 generally relates to the size of the buffer (progressive download 135 generally uses a larger buffer) and whether or not the approach requests different bit rates of the requested file in response to network conditions (adaptive IP streaming 134 will request different chunks of a piece of content at different bit rates in response to network conditions, while progressive download 135 will maintain a constant bit rate). The control inputs 140 include provider inputs 141, user requests 142, personalization 143, and ratings information 144. The delivery networks 150 include a network 151 and a network 152. In one embodiment, the network 151 is a broadcast network, e.g. transmission using a portion of the TV, cellular, Wi-Max, etc., spectrum. In some embodiments, the network 151 may use a wired medium such as a dedicated portion of a cable or fiber optic network. In one embodiment, the network 152 is a unicast network, e.g. transmission over the internet. The end points 160 have customer premises equipment (CPE) 161-162. The CPE 162 includes an end of show handler 181, which will be explained infra.

The interconnection of the elements of system 100 will now be described. The content sources 110 are coupled in communication to the content delivery system 120 (indicated by large triangle). The different sources may arrive via different mechanisms. For example, the public live broadcast 111 may be received using aerial antennas coupled to ATSC or other digital TV tuners. The linear cable channels 112 may be received via satellite downlink or over some other communications channel, e.g. encrypted content received over the internet. The content delivery system 120 may itself be geographically distributed, e.g. controller 121 and storage 122 are located in multiple places throughout the country or a region. For example, the public over-the-air broadcasts of San Francisco television stations must be received in the San Francisco area. However, the physical location of the primary network operations center of the content delivery system 120 may be in Florida. In this embodiment, cable feeds for linear cable channels 112 might be received via satellite downlink in Florida while local public live broadcasts in San Francisco may be received locally in San Francisco. More generally, the controller 121 may be a multitude of computer systems of a variety of types operating in conjunction and communication with one another to provide programming services to the end points 160. Similarly, the storage 122 may be a vast amount of data storage across a variety of systems and providers to store both on demand content 113-115 as well as user requested recordings.

Note also the dotted line representing the over the air broadcast 191 coupling the public live broadcast 111 to the public live broadcast 131 that bypasses the content delivery system 120 en route to end points 160 via network 151. This dotted line shows the standard over the air transmission, e.g. the local NBC affiliate in the San Francisco Bay Area reaching CPEs 161-162 if the customer can get good quality reception of that channel.

Continuing to describe the interconnections, the content delivery system 120 can make use of a number of delivery methods 130 to distribute content to end points 160. One delivery method is private live broadcast 132 which is transmitted over network 151. One example would be sending four cable networks in encrypted form over a portion of the local NBC affiliate's bandwidth in the San Francisco Bay Area. Another delivery method is non-real time data 133 which can be sent via either network 151 or network 152. The remaining delivery methods 130 can be adaptive IP streaming 134 and progressive download 135, both via network 152. The primary differences between the two were discussed, supra. The delivery networks 150 provide the communications channel to reach the end points 160 via their CPEs 161-162. Lastly, the content delivery system 120 receives a variety of control inputs 140. Some control inputs 140 come from the interactions of end points 160 with their CPEs 161-162. Others come from the operator of the content delivery system 120. The communications channels for those control inputs 140 are not shown in FIG. 1.

Having described the elements and their interconnections, the use of the system will be described in greater detail. The system 100 allows the provider operating the content delivery system 120 to offer a range of services to end points 160 via their CPEs 161-162. For example, users might purchase a package with the over the air channels in their area together with approximately 45 cable channels (linear cable channels 112). Some channels could be delivered via private live broadcast 132 over network 151 to the CPEs 161-162 using 20-30 Mbps of broadcast spectrum licensed from various providers such as TV, cellular, Wi-Max, etc. The remaining channels in the package can be delivered via adaptive IP streaming 134 over network 152 to the CPEs 161-162. One capability of the content delivery system 120 is to switch which of the linear cable channels 112 are provided to end points 160 via broadcast and which are provided via IP streaming at different times of the day, week, etc., based on the control inputs 140.

In some embodiments, the CPEs 161-162 are set top boxes, or other dedicated hardware, with the capability to receive programming over multiple networks simultaneously. The antennas for receiving the broadcast signals may be integrated or separate. In other embodiments, the CPEs 161-162 are computers with an antenna and tuner. In other embodiments, the antenna can be a network attached antenna. In still other embodiments, the CPE may be a hybrid "PBX-like" unit serving multiple dwellings in an apartment or residence with additional CPE equipment in each dwelling. We will focus on the CPE 162 which is a set top box with a network antenna that is operated by a remote control for the remainder of this example.

The provider of the content delivery system 120 faces different costs depending on which network is used. In general, the network 151 is created from licensed broadcast spectrum that is paid for once. There are minimal variable costs on network 151 depending on the amount of data transmitted. The network 151, also being broadcast in nature, permits greater distribution with a single transmission and has a high fixed cost. In contrast, the network 152 may have low fixed costs but high variable costs based on the amount of data the content delivery system 120 transmits or needs to transmit in unicast fashion. For example, to permit 10,000 viewers to watch a linear showing of "Iron Chef America" over network 151, approximately 1.5 Mbps of total bandwidth is needed. In contrast to a broadcast transmission, an adaptive IP stream of "Iron Chef America" to the same number over end points over network 152, may have bandwidth requirements closer to 10,000×1.5 Mbps.

Accordingly, control inputs 140 are used by the content delivery system 120 and, in particular, by the controller 121 to determine which delivery methods 130 to use for which content. The provider inputs 141 can include the costs and maximum capacity of the different networks, the traffic load placed on the different networks, manual scheduling/routing decisions, and the like. Similarly, ratings information 144, e.g. Nielsen or Arbitron viewership information, can help optimize the use of the network 151. If more popular content is broadcast, then the amount of adaptive IP streaming 134 over network 152 can be reduced. Other inputs include personalization 143 and user requests 142. Conceptually, the personalization 143 includes information similar to the ratings information 144 but customized for the end points 160. Further, since the content delivery system 120 may be geographically distributed, the usage of the network 151 may be different in different regions. For example, if the San Francisco Bay Area loves "Iron Chef America," the Food Network may be broadcast over network 151 there, while the Food Network may be adaptive IP streamed in another region based on actual viewership habits of the provider's customers. The user requests 142 are requests for specific content. These may be explicit requests such as "record all new episodes of Iron Chef America" or implicit requests created by the CPE 162. For example, the CPE 162 includes a personalization and recommendation system that may have determined that user #1 of the CPE is likely to want to watch "The Sopranos" and so it should be recorded. The CPE 162 can communicate the user requests 142 to the content delivery system 120. This can modify the use of the networks but also permit the content delivery system 120 to record the linear content to the storage 122 for later playback on the CPE 162.

Returning to how the system 100 affords an improved way to handle the end of shows of adaptive IP streams of linear content, consider a user watching the Food Network when it is being delivered via adaptive IP streaming 134. The CPE 162 includes an end of show handler 181 for handling the end of television programming boundaries of linear content delivered via adaptive IP streaming. Stopping the adaptive IP stream when nobody is watching aids the provider and the customer who may both be incurring consumption charges, or reaching bandwidth caps, for adaptive IP streams. In one embodiment, the computer system changes the display of the adaptive IP stream at a specific transition time. In this embodiment, the end of show handler 181 causes a notice or prompt to appear at a set time period before the specific transition time on a display that is in communication with the CPE 162. The notice allows a user to indicate a continued interest in the programming before the system stops the adaptive IP stream. For example, if a program "Iron Chef America" finishes airing at 10:00 pm, then as the end of show time of 10:00 arrives, the end of show handler 181 can cause a notice to be displayed such as "Your program has ended, to keep watching Food Network, press 1". The notice can be displayed some set time before the specific transition time and include a timer, e.g. 30 seconds, 1 minute, 2 minutes, or even in some embodiments longer timers such as 30 minutes. If the user does not respond, the adaptive IP stream is stopped by the end of show handler 181 and the CPE 162 may switch the display, e.g. to an interactive menu or to a display of broadcast content, etc. The notice may partially or fully obscure the linear content, e.g. overlay, inset the content in a region of the display to make room for the notice, etc.

In another embodiment, no notice is explicitly shown on the screen, but a timer of a set time period is started at the end of the show, e.g. a defined time such as 30 minutes. If during the timer no buttons are pressed on the remote and the specific transition time arrives, the end of show handler 181 concludes that the adaptive IP stream is not being actively viewed and stops the stream. The length of the timer may be adaptive, e.g. based on a specific user of the CPE's 162 habits and/or other configurations. For example, if a first user of the CPE 162 usually presses the remote once every ten minutes, then the timer might be set slightly longer than that. The timer for another user of the CPE 162 might be longer if they less frequently use the remote. This embodiment leverages a user identification feature present in some CPEs which provide a remote control, or other input device, with a mechanism for user identification. In some embodiments, the per user time limits may be subject to a system wide cap set by the provider, e.g. 30 minutes maximum.

In some embodiments, the end of show handler 181 may cause the CPE 162 to stop displaying an adaptive IP stream closer in time to the end of a show, (e.g. a shorter set time period) but allow the stream to continue to be transmitted and buffered for some defined time period. In this embodiment, when the program ends the end of show handler 181 might cause the CPE 162 to switch to an interactive menu, or other display, but continue to buffer the stream for a period of time before terminating the stream.

More generally, the end of show handler 181 can be implemented as one or more software programs and/or libraries that, inter alia, use available program guide information. The program guide information can include electronic program guide information retrieved, downloaded, and/or pushed from the content delivery system 120 to determine program boundaries in linear content. The end of show handler 181 may use information in the program guide such as the type of event for adaptive purposes. For example, live events and sports programming delivered via adaptive IP streams might be treated as ending later than the program guide indicates. For example, a baseball game scheduled to air from 8:00-10:00 pm might actually continue airing for another thirty-sixty minutes. The end of show handler 181 may treat live events such as sporting events as having additional time, e.g. extra X minutes, so that the specific transition time is moved along with any corresponding notices and timers, e.g. 10:30 pm in the case of an extra 30 minutes for sporting events.

Summarizing, the architecture of system 100 and the components and mechanism through which it provides an improved way to handle the end of shows of adaptive IP streams of linear content has been discussed.

Conclusion and Alternative Embodiments

We have now described a system and processes that an improved way to handle the end of shows of adaptive IP streams of linear content. The system decreases the streaming bandwidth requirements that would be necessary for broadband delivery of adaptive IP streams of linear content. Additional embodiments will now be discussed.

Although the discussion has focused on adaptive IP streams, the techniques discussed can be applied to any form linear programming delivered by IP streams.

Any data structures and code described or referenced, supra, are stored according to many embodiments on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

The preceding description is presented to enable the making and use of the invention. Various modifications to the disclosed embodiments will be apparent, and the general principles defined herein may be applied to other embodiments and applications without departing from the spirit and scope of the invention. Thus, the invention is not intended to be limited to the embodiments shown, but is to be accorded the widest scope consistent with the principles and features disclosed herein. The scope of the invention is defined by the appended claims.

What is claimed is:

1. A method implemented on a computer system to display a linear content, comprising:
   receiving program guide information associated with the linear content, the program guide information including program boundary information for the linear content;
   determining a program end time for the linear content based on the program boundary information;
   receiving the linear content via IP streaming;
   causing display of the received linear content, in real time with respect to the receiving, on a display in communication with the computer system; and
   determining if a specific transition time has been reached, and if reached, automatically stopping the display of linear content unless a signal is or has been received from a user by the computer system within a set time period of the program end time, wherein the signal is received from the user without the computer system transmitting any notice that user input is necessary to avoid stoppage of the display; and displaying an interactive menu on the display after stopping the display of the linear content, wherein the interactive menu enables the user to select from continuing to display the selected linear content, and displaying other linear content.

2. The method of claim 1 wherein the specific transition time is the program end time.

3. The method of claim 1 wherein the specific transition time is a defined time after the program end time.

4. The method of claim 1 wherein the computer system buffers the IP stream for a defined time after displaying the interactive menu.

5. The method of claim 1 wherein the set time period is adaptable based on the identity of a user, and further comprising the steps of identifying a user, storing user activity in the computer system per user, setting the set time period for the user based on the user activity.

6. The method of claim 1, wherein the program guide information comprises information about the type of program being streamed, and the method further comprising extending the specific transition time when the program is a live event.

7. A computer system configured to display a linear content, comprising:
 a receiver configured to receive program guide information associated with the linear content and to receive the linear content via IP streaming;
 the program guide information comprising program boundary information for the linear content,
 the computer system being configured to determine a program end time for the linear content based on the program boundary information for the linear content and to cause display of the received linear content in real time with respect to the receiving, on a display in communication with the computer system; and further comprising,
 an end of show handler module configured to determine if a specific transition time has been reached, and if reached, to automatically cause the display of linear content to stop unless a signal is or has been received from a user by the computer system within a set time period of the program end time, wherein the computer system is configured so that the signal is received from the user without the computer system transmitting any notice that user input is necessary to avoid stoppage of the display,
 wherein the end of show handler is further configured to display an interactive menu on the display after stopping the streaming of the linear content, the interactive menu enabling the user to select from continuing to display the selected linear content, and displaying other linear content.

8. The system of claim 7 wherein the specific transition time is the program end time.

9. The system of claim 7 wherein the specific transition time is a defined time after the program end time.

10. The system of claim 7 wherein the computer system is further configured to buffer the IP stream for a defined time after displaying the interactive menu.

11. The system of claim 7 wherein the set time period is adaptable based on an identity of a user, wherein the computer system identifies a user, stores user activity information per user, and sets the set time period for the user based on the user activity.

12. A method of end of show handling comprising:
 (a) receiving and displaying content consisting of at least one program on a customer premises equipment having an end of show handler and a display screen;
 (b) determining a specific transition time;
 (c) commencing a set time period before the specific transition time;
 (d) changing the display of the content on the customer premises equipment at the specific transition time if the customer premises equipment does not receive a user signal within the set time period, wherein the user signal is received without the customer premises equipment transmitting any notice that user input is necessary to avoid changing the display; and
 (e) setting a system cap limit on all set time periods stored in the customer premises equipment.

13. A method of end of show handling of claim 12 wherein the content is an IP stream of linear content and the changing of the display of the content constitutes switching the display to a broadcast content.

14. A method of end of show handling of claim 12 further comprising storing user activity information in the customer premises equipment, identifying a user of the customer premises equipment and determining the set time period based on the user habit information for the identified user.

15. A method of end of show handling of claim 14 wherein the user habit information comprises the frequency that the user uses an input device for communicating with the customer premises equipment.

16. A method of end of show handling of claim 12 further comprising buffering the stream of linear content on the customer premises equipment for a buffering period and then terminating the stream at the end of the buffering period.

17. A method of end of show handling of claim 12 further comprising receiving program guide information for the content at the customer premises equipment and determining the specific transition time based on the program guide information.

18. A method of end of show handling of claim 17 wherein the program guide information includes at least a program end time and an indication of whether the program is a live event, and the method further comprising extending the specific transition time a set time value beyond the program end time when the program is a live event.

19. A method of end of show handling of claim 12 wherein the specific transition time is the end of the program.

20. A method of end of show handling of claim 12 wherein changing the display of the content on the customer premises equipment constitutes terminating the receiving and displaying content of the content.

* * * * *